(12) United States Patent
Mayet et al.

(10) Patent No.: US 6,542,567 B1
(45) Date of Patent: *Apr. 1, 2003

(54) GRID FOR NUCLEAR FUEL ASSEMBLY AND A STRAP FOR SUCH A GRID

(75) Inventors: Roland Mayet, Villeurbanne (FR); Michel Bonnamour, Lyons (FR)

(73) Assignee: Framatome, Courbevoie (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/242,694
(22) PCT Filed: Jul. 9, 1998
(86) PCT No.: PCT/FR98/01489
§ 371 (c)(1), (2), (4) Date: Feb. 23, 1999
(87) PCT Pub. No.: WO99/03108
PCT Pub. Date: Jan. 21, 1999

(30) Foreign Application Priority Data

Jul. 11, 1997 (FR) .............................................. 97 08873

(51) Int. Cl.$^7$ ................................................ G21C 3/356
(52) U.S. Cl. ..................... 376/442; 376/438; 376/441; 376/462
(58) Field of Search ................................ 376/438, 442, 376/441, 462

(56) References Cited

U.S. PATENT DOCUMENTS

| | | | | |
|---|---|---|---|---|
| 3,769,159 A | * | 10/1973 | Zinn et al. | 176/78 |
| 3,789,184 A | * | 1/1974 | Piepers et al. | 219/117 R |
| 4,224,107 A | * | 9/1980 | Delafosse et al. | 176/78 |
| 4,396,573 A | * | 8/1983 | Feutrel | 376/442 |
| 4,702,881 A | * | 10/1987 | Weiland et al. | 376/442 |
| 5,139,736 A | | 8/1992 | Bryan | 376/442 |
| 5,331,678 A | | 7/1994 | Hatfield et al. | 376/442 |
| 5,444,748 A | * | 8/1995 | Beuchel et al. | 376/438 |
| 5,515,408 A | * | 5/1996 | Oyama et al. | 376/434 |
| 5,577,081 A | * | 11/1996 | Yaginuma | 376/260 |
| 5,638,416 A | * | 6/1997 | Oyama et al. | 376/442 |

FOREIGN PATENT DOCUMENTS

| | | | | |
|---|---|---|---|---|
| EP | 0025395 | 9/1980 | | 376/442 |
| EP | 0196598 | 3/1986 | | 376/442 |
| FR | 2338549 | 1/1976 | | 376/442 |

* cited by examiner

Primary Examiner—Peter M. Poon
Assistant Examiner—Jack Keith
(74) Attorney, Agent, or Firm—Kenyon & Kenyon

(57) ABSTRACT

At regular intervals, the grid strap has formed therein notches for assembly with transverse straps. Between at least some pairs of notches, it has a rod-holding spring comprising two resilient strips cut out from the plane wall of the strap and integral therewith. Each strip extends transversely relative to its strap and is connected to the common portion of the strap at its two ends. In the free state, the strips project towards the inside of the cell concerned and they are interconnected in the middle by a transverse bridge which projects relative to the two strips.

16 Claims, 4 Drawing Sheets

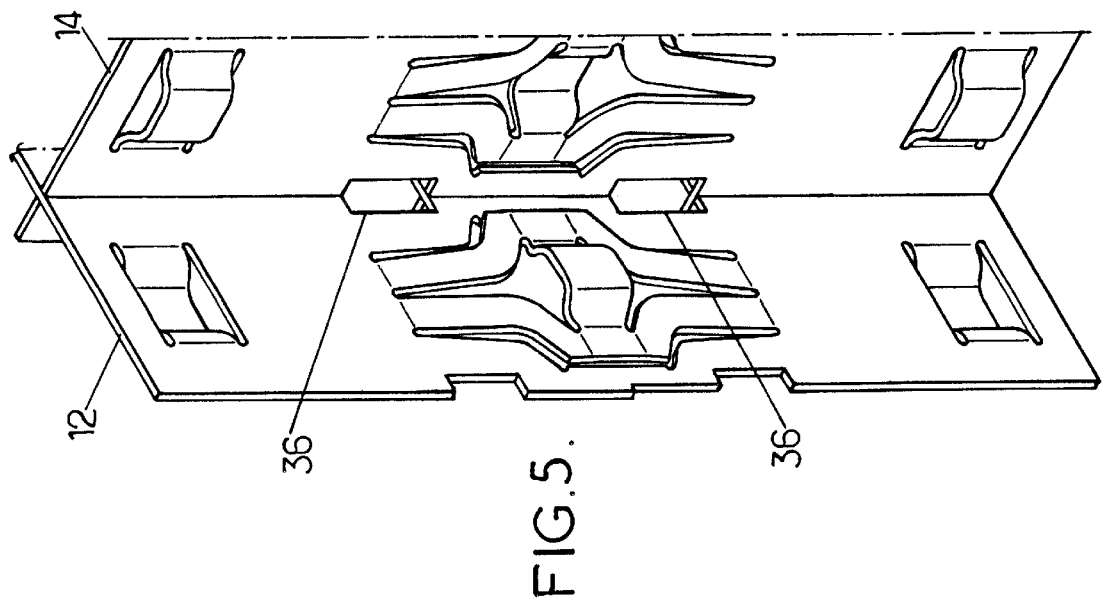
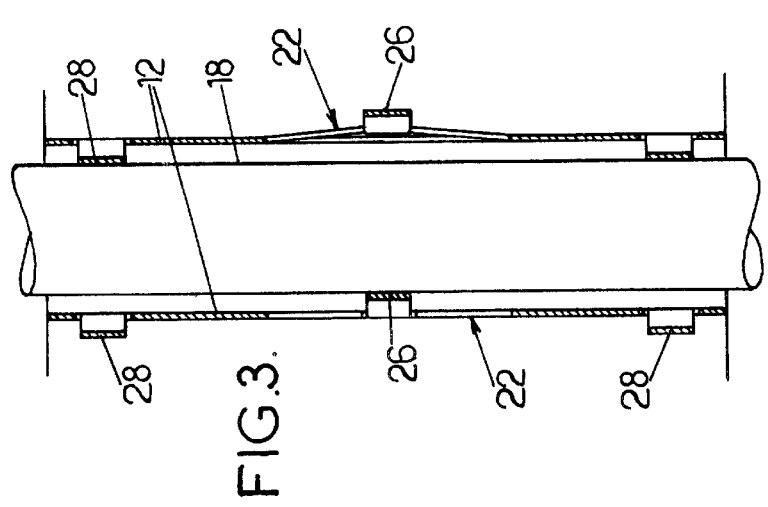
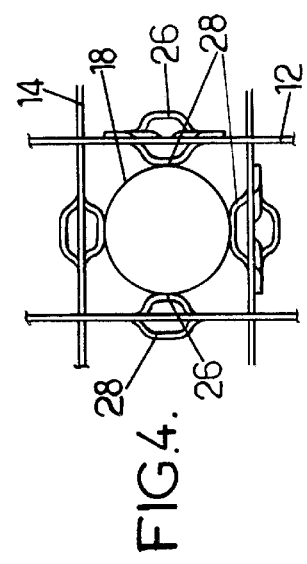

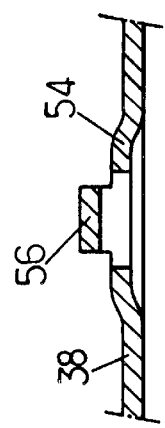
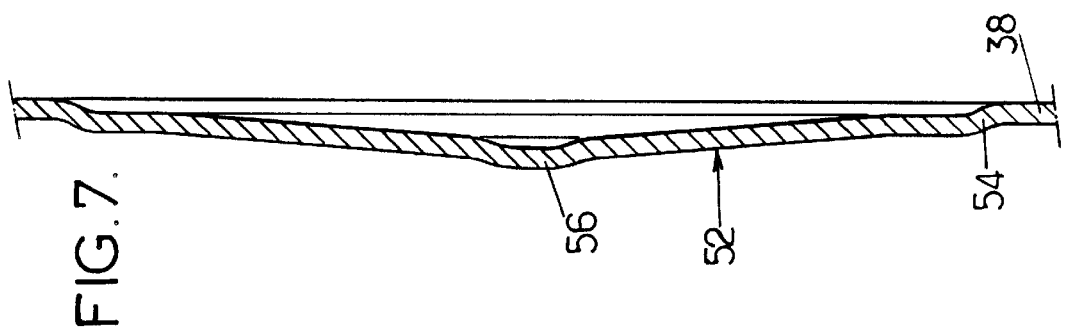
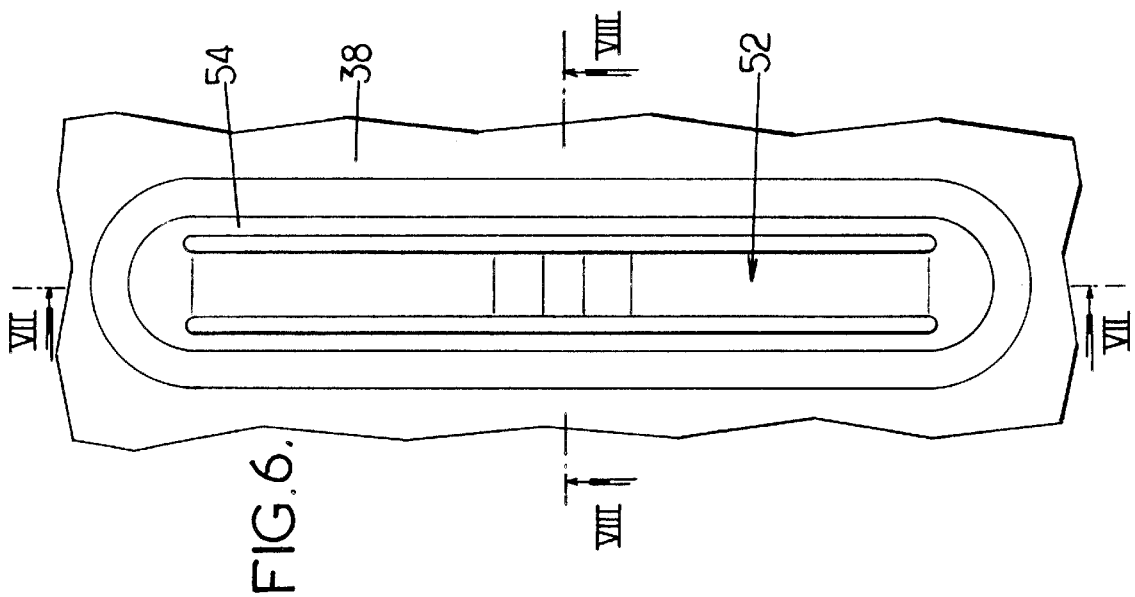

GRID FOR NUCLEAR FUEL ASSEMBLY AND A STRAP FOR SUCH A GRID

BACKGROUND OF THE INVENTION

The invention relates to a grid for holding fuel rods in a nuclear fuel assembly, and in particular to those used in pressurized water reactors to hold the rods at the nodes of a regular array, generally a square array.

The invention relates in particular to the structure of the straps which are assembled together to make up the grids, generally by means of half-depth slots.

The grids of an assembly define common or regular cells designed to receive rods, and other cells which have guide tubes passing through them, the guide tubes often being welded to the grids. Conventionally, in the grids used for holding rods axially and laterally, rigid bearing dimples are formed for the rods in two of the four faces of each common cell for the purpose of receiving a rod, and two holding springs are cut out from or added to the other two faces so as to press the rod onto the dimples.

The invention relates in particular to the straps of a grid in which the springs are integrally formed with the flat portion of each strap. At least in the portion of the assembly which is subjected to a high level of neutron flux, these straps are made of a zirconium based alloy such as Zircaloy 4. Under neutron radiation, the mechanical characteristics of such alloys are degraded. Proposals have already been made to limit the consequences of such degradation by making the springs in special manner. Document FR-A-2 338 549 describes a grid strap in which each spring comprises a flexible corrugated strip extending in the flow direction of the coolant, i.e. transversely relative to the strap, or two parallel strips that are interconnected in their middle portions by a portion which projects into the flow and which is extended, between the strips, by two tabs. This projecting portion constitutes an obstacle which disturbs the flow of coolant. Document WO-A-94/25935 describes a spring constituted by a resilient strip whose ends are connected to the current portion of the strap via two stamped bridges. Given their orientation, the bridges do not hinder the flow of coolant to any significant extent, but the bend taken up by the blade when pressed against a rod still constitutes an obstacle to the flow.

SUMMARY OF THE INVENTION

It is an object of the invention to provide a strap having holding springs of a structure such that they provide a satisfactory compromise between mechanical strength, conserving a satisfactory level of resilient holding force, and high transparency to the flow of coolant.

To this end, the invention provides, in particular, a grid strap for holding fuel rods, in which there are formed notches at regular intervals for assembly with transverse straps, and between at least some pairs of notches, rod-holding springs each comprising two resilient strips cut out from the plane wall of the strap and integral therewith, each strip extending in the axial flow direction in a grid including the strap and is connected to the strap at its two ends, the strips projecting, at least when in released condition, towards the inside of the cell concerned and being interconnected in their middles by a transverse bridge projecting relative to both strips.

The springs of an internal strap may all have the same structure, or they may be of different structures, for example depending on whether the wall in which the spring is formed separates two cells that are both occupied by a rod, or separates two cells, one of which is occupied by a guide tube.

In the first case, the two resilient strips advantageously join together in the vicinity of their roots, i.e. their zones close to where they connect to the current portion of the strap, and are on the contrary remote from each other in their central portions which are interconnected by the bridge. In particular, the portions close to the roots and the central portions may be rectilinear in the flow direction; each root is then connected to the corresponding central portion via a zone that is curved or oblique. Such a structure avoids having large openings in the strap which could disturb the flow, in particular by allowing uncontrolled interchanges between cells.

In the second case, the strap constitutes a cell wall backing a guide tube; the spring can be constituted by two mutually parallel strips in the flow direction, having their central portions interconnected by the bridge. There is no drawback in having an opening in the strap at this location, given that the opening is closed by the guide tube.

On either side of such a spring, in the flow direction, there remains a substantially flat zone in which the strap can be fixed to the guide tube by welding.

The rod is provided with support on its side opposite from its side against which the spring presses. For this reason, the spring, situated in a middle portion of the strap, is generally located between two bearing areas constituted by stamped bridges extending transversely to the flow so as to avoid significantly altering the flow section for the coolant. The bridges of the springs and those of the bearing areas may be of the same shape.

The initial shape given to the spring strips by stamping is advantageously such that the strips are pushed back substantially into the same plane as the current portion of the strap when a rod is inserted and is to be held by the spring. The bridges and the dimples advantageously project equally into the cell when the springs are in the active position.

The straps may also be provided with deflector fins for improving mixing of the coolant, which fins are curved in shape.

As a general rule, the grid has outer straps constituting a belt and in abutment against innner straps via tenon-and-mortise type links. The outer straps may have guide fins for limiting the risk of catching between the grids of adjacent fuel assemblies while a fuel assembly is being loaded or unloaded.

In an advantageous embodiment, the outside plates are curved at the base of the guide fins so as to follow the shape of the terminal edges of the common inner straps which have curved shapes for this purpose.

The outer straps may also contribute to holding peripheral rods and may be provided with springs. Given the relatively small number of grid cells concerned, and in order to make these straps very strong, the springs which are obtained by cutting out and stamping, may be disposed in the flow direction.

In particular, the straps may be made out of one of the zirconium alloys known as "Zircaloy 4", in the recrystallized state.

The above characteristics, advantageously usable in combination, but capable of being used separately, together with other characteristics, appear more clearly on reading the following description of particular embodiments, given

BRIEF DESCRIPTION OF THE DRAWINGS

FIG. 3 is a cross-sectional view along a plane containing the axis of a cell containing a rod, showing one spring in its active position and another spring in the free state;

FIG. 4 is a plan view of FIG. 3;

FIG. 5 is a view similar to a fragment of FIG. 1, showing a modified embodiment that makes it possible to increase the strength of the grids;

FIG. 6 is a front view of a fragment of an outside strap belonging to the belt of the grid, showing a spring for holding a rod, which spring is of reinforced resilience and is less sensitive to accidental external stresses;

FIGS. 7 and 8 are section views of FIG. 6 respectively along lines VII—VII and VIII—VIII;

DETAILED DESCRIPTION OF PREFERRED EMBODIMENTS

Figure 1:
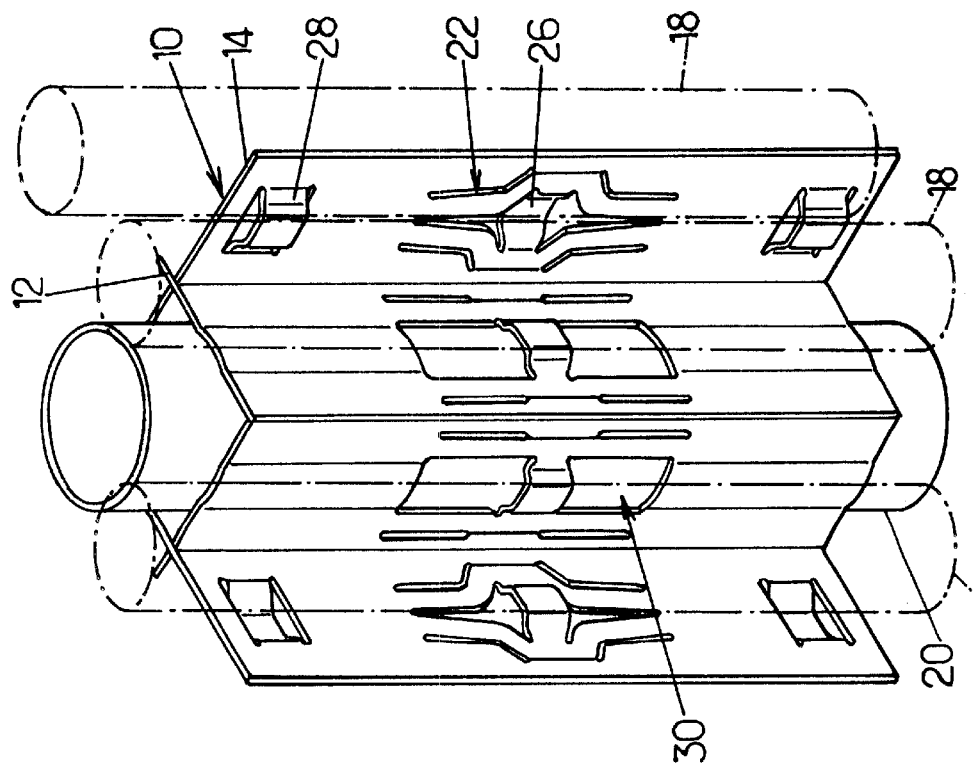
FIG. 1 is a perspective view of a fraction of a grid and a guide tube, the inside straps being provided with springs constituting a particular embodiment, and shown in the free state.
Figure 2:
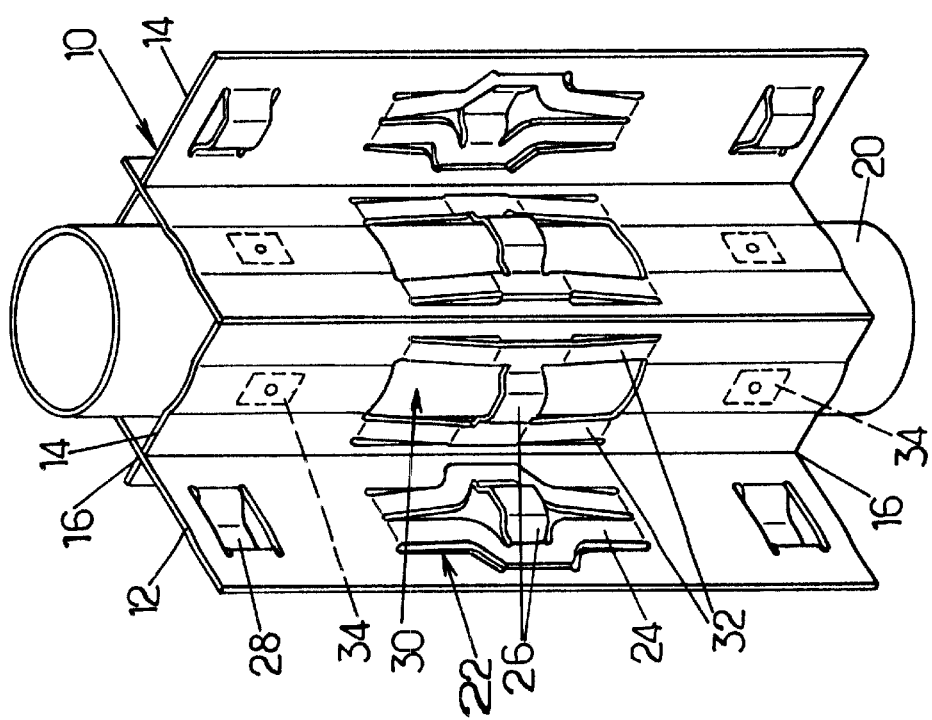
FIG. 2 is similar to FIG. 1, showing the springs in the "active" position, i.e. in the state where they are forced back by an abutting rod.

The grid 10, a fragment of which is shown in FIGS. 1 and 2, is constituted in particular by two sets of crossed straps 12 and 14 that are mutually engaged via half-depth notches provided for this purpose. These straps are fixed to one another, e.g. by welding at the cross-points 16. The straps 12 and 14 define cells that are to receive fuel rods 18, such as those shown in chain-dotted lines in FIG. 2. However, some of the cells receive guide tubes 20 designed to provide a passage for the absorbent rods of control rod clusters. In general, at least some of the guide tubes are fixed to the grids. They interconnect top and bottom fuel assembly nozzles (not shown).

At least some of the grids of an assembly are designed to hold the rods at the nodes of a regular array and to support them vertically. The grid shown by way of example in FIGS. 1 and 2 performs both of these functions. For this purpose, in two orthogonal directions, the grid includes bearing means formed in one face of a cell and a spring cut out from the opposite face of the cell serving to press the rod against the bearing means.

Two of the faces of each cell containing a rod have respective springs of resilience urging them to project into the cell. The structure of such a spring varies depending on whether it is backed by a cell that is to receive a fuel rod or a cell that contains a guide tube 20.

Each of the springs 22 between two cells occupied by rods is constituted by two resilient strips 24 cut out from the plane wall of the strap, and integral therewith, which strips are interconnected in their middles by a transverse bridge 26 projecting relative to the two strips. Each strip extends transversely to the long dimension of the strap, i.e. in the flow direction. Each strip 24 is connected to the strap at both ends. At rest, a strip slopes towards the inside of the cell from each end (FIG. 1). The bridge projects further relative to the two strips that it interconnects.

In the flow direction, each spring 22 lies between bearing means constituted by two bosses 28. The bosses 28 and the bridges 26 may be of exactly the same shape.

The springs and the bridges can be fabricated in conventional manner, by stamping and stretching.

The resilient strips 24 touch each other close to their roots, and they are spaced apart from each other in their middle portions so as to leave the room required for the bridge. In this way, the gaps between the two strips which puts two adjacent cells each occupied by a rod into communication is narrow in width; it hardly disturbs the flow.

Springs 30 backing onto a cell containing a guide tube 20 also comprise two resilient strips that are cut out from the strap and interconnected in their middle portions by a bridge 26. However, the two strips 32 of the spring 30 extend substantially parallel to each other and to the flow direction. The gap that this establishes is not a drawback since the gap is closed by the guide tube 20.

The grid can be fixed to the guide tubes by spot welds, either in zones 34 that are substantially plane or slightly curved situated on either side of the springs 30, or else on tabs formed at the top and/or bottom portions of the straps in register with the cell containing the guide tube 20.

The extent to which the bridges 26 project relative to the strips, and the shape of the strips at rest are advantageously selected in such a manner that the strips are forced back substantially into the same plane as the current portion of each strap when the rods 18 are in place, as can be seen in FIGS. 2, 3, and 4.

By way of example, in FIG. 3, the spring 22 of the strap 12 is straight and projecting because it is not being pushed back by a rod. In contrast, the spring 22 of the left strap is bent by a rod 18 at a point such that its strips lie in practically the same plane as the common portion of the strap 20, thereby preventing them from impeding the flow.

To increase the strength of such grids, the straps can be welded together not only at the cross-points 16 in each of the major faces of the grid, but also at additional locations. By way of example, FIG. 5 shows straps 12 having pairs of additional windows 36 in alignment with each line of crossovers with other straps. This provides access making it possible to weld the straps together at two additional points at least. Welding is performed by means of a tool which is inserted into the grid, e.g. a laser beam tool. The windows 36 are generally situated between the bosses, level with a spring, in the flow direction.

The grid may have four outer straps that are interconnected to form a belt. While a fuel assembly is being loaded or unloaded, there is a risk of a belt of the assembly catching on the belt of an adjacent assembly. To reduce this risk, proposals have already been made to curve the corners of the belt inwards. The risk of catching is further reduced with a belt of the kind shown in part in FIGS. 9 and 10. The belt-constituting outside straps have a special shape. These straps are curved inwards in their portions 40 close to their upstream edges and 42 close to their downstream edges. The ends of the common straps 12 and 14 are cut out accordingly. The upstream portion of the end of each strap 12 or 14 is rounded or chamfered and may also have a stud 44 engaged in a slot of the curved portion of the belt strap.

The downstream portion at the end of each strap 12 or 14 includes a projection 46 directed in the flow direction, having rounded or chamfered edges, and against which the belt bears. This projection may also have a stud 44. The extent to which the projection extends may be substantially equal to the extent to which the flow deflection fins 48 extend in conventional manner.

Figure 10:
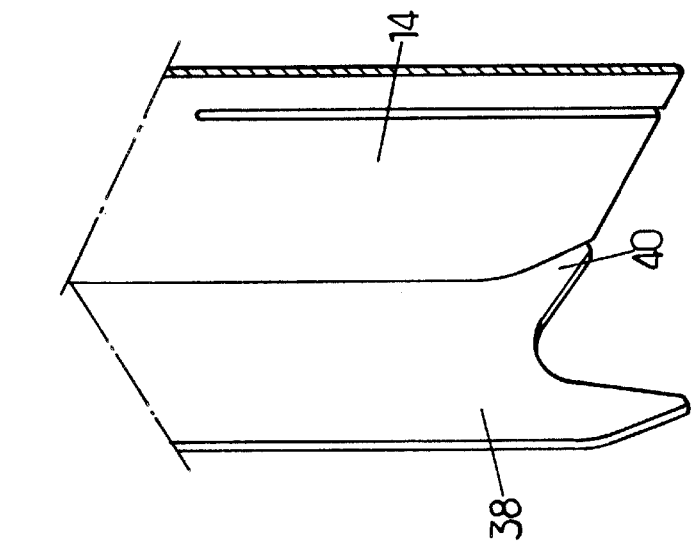
FIG. 10 is a perspective view showing a fragment of a grid of the kind shown in FIG. 9.
Figure 9:
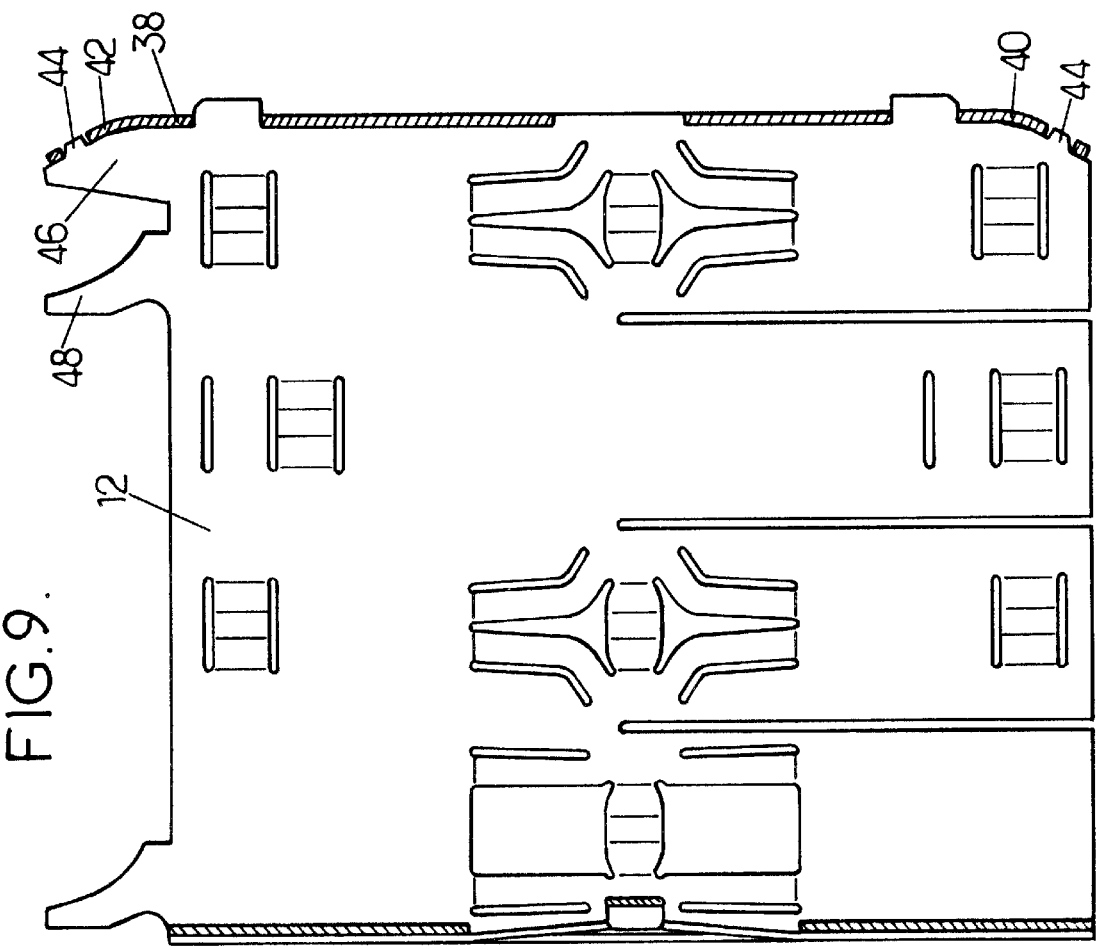
FIG. 9 shows a fragment of a strap including springs of the kind shown in FIG. 1 and its junction with a belt strap.

The belt shown in FIGS. 9 and 10 may be used with common straps 12 and 14 having springs of a structure that is different from that shown in FIGS. 1 to 4; in particular they may be of conventional structure.

The springs for holding the peripheral rods situated against the outer belt can be exposed to accidental stresses which run the risk of spoiling their support function. In an advantageous embodiment of the invention, the grid has a belt 38 in which reinforced springs are provided. For this purpose, the room for displacement of the resilient blades is restricted, and they are provided with additional protection by setting them back relative to the outside face of the grid.

Reinforcement can be provided in particular by means of the kind shown in FIGS. 6 to 8. The spring 52 is constituted by cutting out and bending a zone of the belt which is deformed inwards so as to constitute a swelling 54. In FIG. 6, it can be seen that this swelling is of elongate shape in the flow direction, and thus in the spring direction, with parallel edges interconnected by semicircular portions. The swelling may also be made by stamping or by shaping in a press.

The spring 52 itself is of conventional shape, with a projecting central portion 56, however this shape is not essential. At rest it may project by an amount that is different from the amount by which the springs 22 and 30 project. Because of the presence of the swelling, the spring is protected against any risk of direct external attack, thereby making it possible to take full advantage of the lateral cutouts to give it optimum resilience and stiffness. Furthermore, the swelling puts a natural limit on the maximum bending of the spring by limiting the extent to which a rod can move towards the outside of the grid to a value such that the rod comes to bear thereagainst.

When it is necessary to reduce the headlosses imparted to the coolant to as small a value as possible, the upstream edges of the straps, of the belt, of the dimples, and/or of the bridges can be shaped, for example as described in the patent application filed on the same day as the present application and entitled "A grid strap for a nuclear fuel assembly, and a grid including such straps".

What is claimed is:

1. A grid strap for holding fuel rods, having a plane wall elongated in a direction with notches distributed at regular intervals along said direction for assembly with transverse straps and formed with rod holding springs located between at least some pairs of notches, each of said rod-holding springs comprising two resilient strips cut out from the plane wall of the strap and integral therewith, each of said strips extending mainly in a width direction transverse to the direction of elongation and being connected to the remainder of the strap at two ends thereof, the strips projecting, when in released condition, out of the plane of said wall and being interconnected in their middle by a transverse bridge projecting relative to both strips in a same direction as said strips project from the plane of said wall, the two resilient strips of at least some of the springs joining together in the vicinity of their roots and being spaced apart from each other in their central portions which are interconnected by said bridge.

2. A strap according to claim 1, wherein the springs are of different structures depending on whether the wall portion in which the spring is formed lies between two cells that are both occupied by one of respective rods, and between two cells, one of the two cells occupied by a guide tube.

3. A strap according to claim 1, wherein the two strips of only some of the springs are substantially parallel to each other and to the flow direction.

4. A grid strap according to claim 1, further comprising two bosses projecting in a direction opposite to that of said springs, said springs for backing a cell for a fuel rod lies, in a direction extending transversely to the direction of elongation of said strap and between said two bosses.

5. A strap according to claim 4, wherein said transverse bridge and said two bossed located on either side of said transverse bridge and constituting an abutment arrangement for one of said fuel rods, are of a same shape.

6. A grid strap for holding fuel rods, having a plane wall elongated in a direction with notches distributed at regular intervals along said direction for assembly with transverse straps and formed with rod holding springs located between at least some pairs of notches, each of said rod-holding springs comprising two resilient strips cut out from the plane wall of the strap and integral therewith, each of said strips extending mainly in a width direction transverse to the direction of elongation and is connected to the remainder of the strap at two ends thereof, the strips projecting, when in released condition, out of the plane of said wall and being interconnected in their middle by a transverse bridge, said bridge comprising a first end connected to a first of said strips, a second end connected to a second of said strips and an intermediate portion projecting relative to both strips, said bridge exhibiting a concavity between the first end and the second end, said concavity being directed towards said strips, a shape of the strips and of the bridge of each spring being such that the strips are pushed back resiliently into a same plane as a current portion of the strap provided with the spring by a presence of a rod in contact with the bridge in a cell adjacent to the strap and defined thereby.

7. A strap according to claim 6, wherein some of the springs have parallel said strips and are backed by a cell which has a guide tube passing therethough.

8. A strap according to claim 7, wherein each of the springs having parallel strips lies, in a direction extending transversely relative to the direction of elongation of the strap, between weld zones that are one of substantially plane and slightly curved.

9. A grid strap for holding fuel rods, having a plane wall elongated in a direction with notches distributed at regular intervals along said direction for assembly with transverse straps and formed with rod holding springs located between at least some pairs of notches, each of said rod-holding springs comprising two resilient strips cutout from the plane wall of the strap and integral therewith, each of said strips extending mainly in a width direction transverse to the direction of elongation and is connected to the remainder of the strap at two ends thereof, the strips projecting, when in released condition, out of the plane of said wall and being interconnected in their middle by a transverse bridge, said bridge comprising a first end connected to a first of said strips, a second end connected to a second of said strips and an intermediate portion projecting relative to both strips for contacting a rod, the shape of the strips and of the bridge of each spring being such that the strips are pushed back resiliently into the same plane as a current portion of the strap provided with the spring by the presence of a rod in contact with the bridge in a cell adjacent to the strap and defined thereby.

10. A grid for holding fuel rods for a nuclear fuel assembly, the grid being constituted by two crossed sets of straps, wherein each of said straps of one set has a plane wall elongated in a direction, formed with notches distributed at regular intervals along said direction for assembly with transverse straps of the other set and formed with rod holding springs located between at least some pairs of notches, each of said rod-holding springs comprising two resilient strips cut out from the plane wall of the strap and integral therewith, each of which strips extending mainly in a direction which is transverse to the direction of elongation and orthogonal to a major face of the grid and being connected to the remainder of the strap at two ends thereof, the strips projecting, when in released condition, out of the plane of said wall and being interconnected in their middle by a transverse bridge projecting relative to both strips in a same direction as said strips project from the plane of said wall, the two resilient strips of at least some of the springs joining together in a vicinity of their roots and being spaced apart from each other in their central portions which are interconnected by said bridge, and an upstream portion of each end of each strap includes reinforcements of curved shape serving as bearing points for an inwardly curved belt.

11. A grid according to claim 10, wherein the said reinforcements of curved shape include a stud engaged in a hole in the curved portion.

12. A grid according to claim 10, wherein said curved belt carries reinforced springs, integral therewith.

13. A grid according to claim 10, wherein each spring of said curved belt is cut out from a zone of the belt which is inwardly deformed to constitute a swelling, protecting said springs against direct external stresses and against excessive outwards displacement of the rod.

14. A grid according to claim 10, wherein each of said straps is formed with windows located in alignment with said notches and wherein two mutually crossing said straps are welded at crossing points on the major faces of the grid and at least two points within said windows.

15. A grid for holding fuel rods for a nuclear fuel assembly, the grid being constituted by two crossed sets of straps, wherein each of said straps of one set has a plane wall elongated in a direction, formed with notches distributed at regular intervals along said direction for assembly with transverse straps of the other set and formed with rod holding springs located between at least some pairs of notches, each of said rod-holding springs comprising two resilient strips cut out from the plane wall of the strap and integral therewith, each of which strips extending mainly in a direction which is transverse to the direction of elongation and orthogonal to a major face of the grid and being connected to the remainder of the strap at two ends thereof, the strips projecting, when in released condition, out of the plane of said wall and being interconnected in their middle by a transverse bridge, said bridge comprising a first end connected to a first of said strips, a second end connected to a second of said strips and an intermediate portion projecting relative to both strips, said bridge exhibiting a concavity between the first end and the second end, said concavity being directed towards said strips, the shape of the strips and of the bridge of each spring being such that the strips are pushed back resiliently into the same plane as a current portion of the strap provided with the spring by the presence of a rod in contact with the bridge in a cell adjacent to the strap and defined thereby.

16. A nuclear fuel assembly comprising fuel rods and grids for holding the fuel rods, at least a first of said grids being constituted by two crossed sets of straps, wherein each of said straps of one set has a plane wall elongated in a direction, formed with notches distributed at regular intervals along said direction for assembly with transverse straps of the other set and formed with rod holding springs located between at least some pairs of notches, each of said rod-holding springs comprising two resilient strips cut out from the plane wall of the strap and integral therewith, each of which strips extending mainly in a direction which is transverse to the direction of elongation and orthogonal to a major face of the grid and being connected to the remainder of the strap at two ends thereof, the strips being interconnected in their middle by a transverse bridge, said bridge comprising a first end connected to a first of said strips, a second end connected to a second of said strips and an intermediate portion projecting relative to both strips, said bridge exhibiting a concavity between the first end and the second end, said concavity being directed towards said strips, the bridge being in contact with a rod in a cell adjacent to the strap and defined thereby and the strips extending into the same plane as a current portion of the strap provided with the spring.

* * * * *